United States Patent [19]

Johnson

[11] Patent Number: 4,650,382

[45] Date of Patent: Mar. 17, 1987

[54] TIE-DOWN RAIL FOR TRUCK BED

[76] Inventor: Harold G. Johnson, 153 Vulco Dr., Hendersonville, Tenn. 37075

[21] Appl. No.: 712,188

[22] Filed: Mar. 15, 1985

[51] Int. Cl.⁴ .............................................. B61D 45/00
[52] U.S. Cl. .................... 410/110; 410/115; 410/116
[58] Field of Search ............... 410/96, 101, 106, 108, 410/110, 115, 116

[56] References Cited

FOREIGN PATENT DOCUMENTS 607914 11/1960 Canada ................................. 410/110
634656 1/1962 Canada ................................. 410/108

OTHER PUBLICATIONS

J. C. Whitney—Parts & Accessories, Jul. 1984, Catalogue #448B, p. 63.

Primary Examiner—Robert B. Reeves
Assistant Examiner—Glenn B. Foster
Attorney, Agent, or Firm—Harrington A. Lackey

[57] ABSTRACT

An elongated unitary tie-down rail adapted to fit the top ledge of the sidewall of a truck bed, including a bottom flange and an upright flange formed at an acute angle. The top portion of the upright flange terminates in an enlarged elongated rod portion, and a plurality of longitudinally spaced slots are formed in the upright flange immediately below the rod portion to receive tie-down members for securing a load within the truck bed.

9 Claims, 7 Drawing Figures

TIE-DOWN RAIL FOR TRUCK BED

BACKGROUND OF THE INVENTION

This invention relates to a tie-down rail for the sidewall of a truck bed, and more particularly to a unitary tie-down rail.

Heretofore, tie-down rails of various types have been connected to the tops of the opposite sidewalls of a truck bed, particularly the bed of a pick-up truck, to provide means for securing the opposite ends of tie-downs, such as ropes or cables, stretched transversely over the top of the truck bed, for securing a load within the truck bed. The ends of the tie-down ropes may be tied to the rails. The ends of flexible cables or chains may be attached to hooks which are connected to the rails.

One form of tie-down rail which has been used, consists of an elongated, straight, hollow tubular member supported above and parallel to the top of each sidewall by longitudinally spaced standards or stanchions. Such a tie-down rail incorporates several separate members, that is the elongated tubular member, and the individual standards. Each of the standards must be separately secured to the top of the sidewall, and the tubular member must be secured to the separate standards. Usually, there is considerable space between standards, so that a rope tied around the tubular member, if sufficiently loose, or if it becomes loosened, can slide the lenoth of the section of the tubular member between standards, which might shift the tie-down member to an unsecure position relative to the load carried within the truck bed.

Some truck beds, including pick-up truck beds, include stake holes for receiving upright stakes to increase the effective height of the side walls for securing a load within the truck bed. Ropes, cables or other tie-down members sometimes are tied to the opposed stakes, or even to the stake holes, in order to extend across and retain a load within the truck bed.

SUMMARY OF THE INVENTION

It is therefore an object of this invention to provide a tie-down rail for a truck bed, and particularly for a pick-up truck bed in which the rail member is made of one-piece solid material to provide its own integral support and tie-down structure. The only other parts needed to secure the tie-down rail, made in accordance with this invention, to the top ledge of a truck bed sidewall are the connectors for securing the rail to the ledge, such as bolts, screws or toggle bolts.

The tie-down rail made in accordance with this invention is an elongated member having an entirely angular cross-section incorporating a bottom flange and an upright flange integrally joining and projecting upwardly from, the outboard edge of the bottom flange. In a preferred form of the invention, the upright flange leans inboard relative to the bottom flange and is disposed at an acute angle to the bottom flange. The longitudinal top edge of each side flange is enlarged to form an elongated rod portion. Immediately below the rod portion and formed within the upright flange are a plurality of longitudinally spaced slots or openings to receive the ends of the tie-downs or lashings threaded through the openings and around the rod portions for securing a load within the truck bed.

The bottom flange is provided with fastener holes for receiving bolts, screws or toggle bolts, which project through registering holes within the top ledge of the sidewall of the truck bed to permit firmly securing the bottom flange flush against the top ledge of the sidewall.

The unitary construction of the tie-down rail made in accordance with this invention permits the rail to be quickly and easily installed upon the sidewall utilizing a minimum of time and effort.

Moreover, the integral and solid construction of each angular rail member provides stability and strength to the rail member to resist the tensile forces of the tie-downs stretched across a load within the truck bed, exerted upon the tie-down rail members.

DESCRIPTION OF THE PREFERRED EMBODIMENTS

Figure 1:
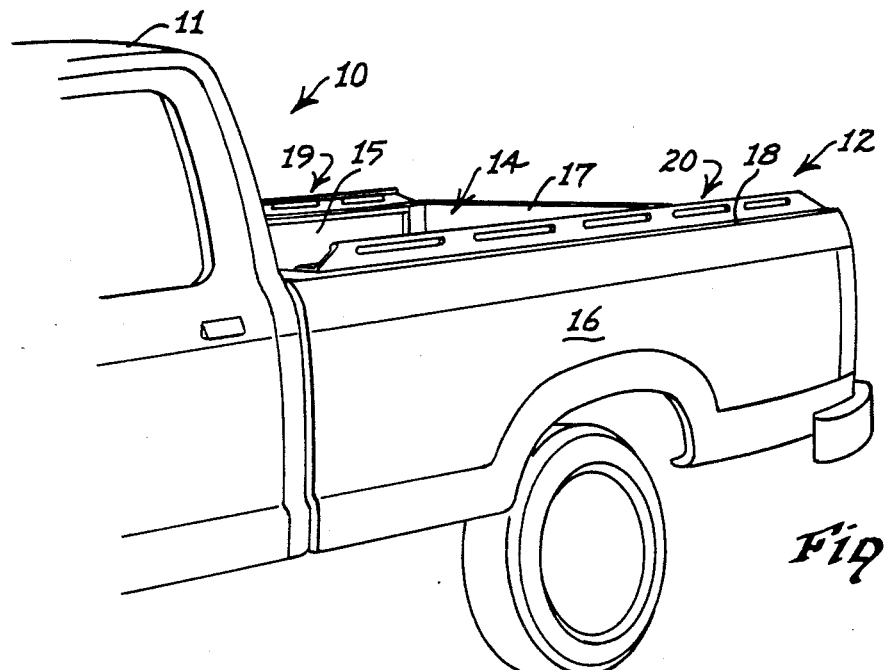
FIG. 1 is a fragmentary front and side perspective view of a pick-up truck in which a pair of tie-down rails, made in accordance with this invention, are installed upon the opposite sidewalls of the truck bed.
Figure 2:
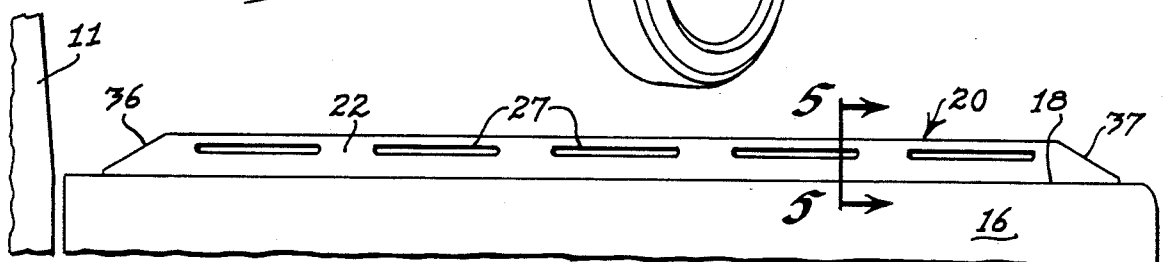
FIG. 2 is an outboard side elevational view of a tie-down rail, made in accordance with this invention, mounted in operative position upon the sidewall of a pick-up truck, shown fragmentarily.
Figure 3:
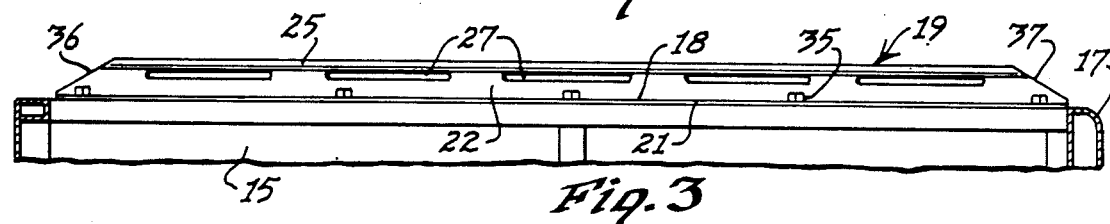
FIG. 3 is an inboard side elevational view of a tie-down rail mounted on the opposite sidewall of the truck bed disclosed in FIG. 1.
Figure 4:
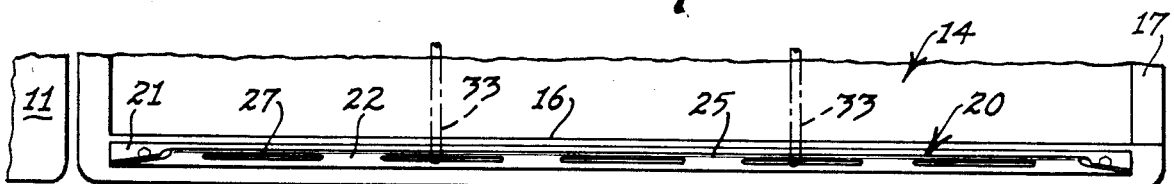
FIG. 4 is a fragmentary top plan view of the tie-down rail disclosed in FIG. 2, operatively mounted upon the sidewall of a pick-up truck bed, with tie-down ropes shwon in operative position in phantom.

Referring now to the drawings in more detail, FIGS. 1-4 disclose a conventional pick-up truck 10 including a cab 11 and a truck bed 12. The bed 12 includes a storage space 14 confined by the cab 11, a pair of opposed sidewalls 15 and 16, and a tailgate 17. Each sidewall 15 and 16 has an elongated substantially flat, top ledge 18.

Mounted on the right sidewall 15 is an elongated unitary tie-down rail 19, made in accordance with this invention. Mounted on top of the left sidewall 16 is another tie-down rail 20 made in accordance with this invention. The tie-down rails 19 and 20 are identical in construction, except that each is the mirror image of the other, so that each is adapted to fit its respective opposite sidewall 15 and 16. Identical reference numerals will be used for the same complementary parts in both the tie-down rails 19 and 20.

Actually, a tie-down rail 19 is interchangeable with a tie-down rail 20, by merely reversing the tie-down rail 19 end-for-end and placing it upon the opposite sidewall 16.

The tie-down rail 20 is an elongated unitary rail member having an angular section and made of solid one-piece material, such as steel, and a length substantially coextensive with, but slightly less than, the length of the ledge 18 of the sidewall 16.

Figure 5:
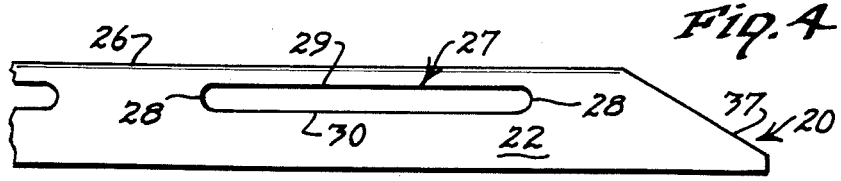
FIG. 5 is an enlarged, fragmentary, sectional elevation taken along the line 5—5 of FIG. 2, and illustrating the hook of a tie-down, disclosed in phantom, connected to the side rail.
Figure 6:
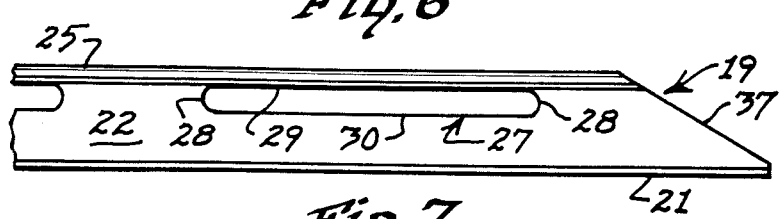
FIG. 6 is an enlarged, fragmentary, outboard side elevational view of the rear portion of the tie-down rail disclosed in FIG. 2.
Figure 7:
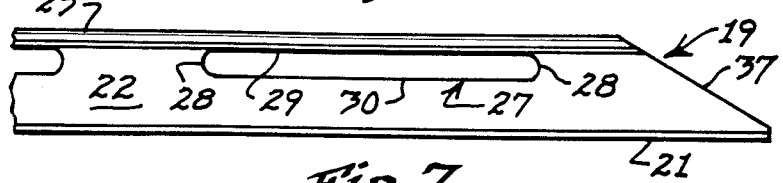
FIG. 7 is an enlarged, fragmentary, inboard side elevational view of the rear portion of the opposite tie-down rail disclosed in FIG. 3.

The tie-down rail 20 includes an elongated bottom flange 21 and a coextensive elongated upright side flange 22. The bottom flange 21 has a bottom surface 23 (FIG. 5) adapted to fit substantially flush against the top ledge 18, and is preferably planar.

The outboard edge portion of the bottom flange 21 is integral with the bottom portion of the upright flange 22 to form an intersecting merging portion 24.

The thickness of the bottom flange 21 is substantially uniform and is substantially equal to the uniform thickness of the major portion of the upright flange 22. However, the intersecting merging portion 24 is substantially thicker than the respective bottom flange 21 and the upright flange 22, to provide additional strength at the juncture of the bottom flange 21 and the upright flange 22.

Moreover, the upright flange 22 preferably leans inboard and forms an acute angle, so that the upright flange 22 projects upward from the outboard edge portion of the bottom flange 21 and inboard over the bottom flange 21.

The upper edge portion of the upright flange 22 terminates in an enlarged longitudinal, and preferably straight, rod portion 25, whose cross-section is substantially larger than the thickness of the upright flange 22. Moreover, the outer surface 26 of the rod portion 25, in cross-section, is preferably rounded and also smooth. In a preferred embodiment, the cross-section of said rod portion is at least three times the thickness of said upright flange 22, and preferably 3-5 times the thickness of the upright flange 22.

Formed through the upper portion of the upright flange 22 are a plurality of longitudinally spaced openings or slots 27. As disclosed in the drawings, the slots 27 are elongated, having curved or rounded end portions 28, a straight top edge portion 29 and a straight bottom edge portion 30. The top edge portion 29 is closely adjacent the rod portion 25, and preferably forms a continuous extension of the curved surface 26, as best disclosed in FIG. 5. Thus, each slot 27 is so positioned that it will receive the connector end portion of a tie-down, such as the hook 32 disclosed in FIG. 5, or the looped end of a flexible linear tie-down member, such as the rope 33 in FIG. 4. Thus, the connector end of the tie-down, such as the hook 32, can extend through an elongated slot 27 and fit snugly around the rod portion 25.

The rod portion 25 is thicker than the respective flanges 21 and 22, so that it will lend additional stiffness and reinforcement to each of the rails 19 and 20, and will make the respective rail 19 and 20 longitudinally rigid.

Each of the slots 27 has a predetermined length to permit limited longitudinal adjustment of the connected ends of the tie-down so that the tie-downs or ropes 33 may be longitudinally adjusted, before connection, in order to accommodate the particular load to be secured within the truck bed 12.

To provide one continuous elongated slot extending from one end of the rail to the other, would weaken the rail member. Moreover, one continuous elongated slot would expose too long of a rod portion 25 about which a loose connected end of a tie-down might slip longitudinally so far as to disengage the load to be secured within the truck bed 12.

If the connected end of the tie-down 33 is loose about the rod portion 25, it will slip longitudinally, but only for a limited length, determined by the length of the corresponding slot 27.

It is also within the scope of this invention to incorporate longitudinally spaced circular slots, which would eliminate longitudinal slipping, but would require re-threading and re-connecting the ends of the tie-downs for each longitudinal adjustment of the tie-downs over the load.

Usually, when tie-downs are employed, the load projects above the sidewall ledges 18. In such event, the tie-down members 33 extend between the opposite rails and rise in the middle, up and over the loads to be secured. Accordingly, in the majority of loading situations, the linear member 33 is extending upward and inboard from the particular rail to which it is connected, and to some extent in line with the upward and inward projecting upright flange 22. Accordingly, the upright flange 22 is preferably leaning inboard to minimize the lateral bending torque exerted upon the upright flange 22 by the tie-down member 33. The acute angle may vary, but may be within the range of 45°-80°, and preferably in the range of 75°-80°. In one specific embodiment, the rail 20, the angle has been 79°.

The bottom flange 21 is provided with pre-formed bolt holes or apertures 34 for receiving fastener members, such as the bolts 35. The bolts 35 extend through the holes 34 within the bottom flange 21 and also through corresponding registering holes formed in the top ledge 18 of the respective sidewalls 15 and 16. The bolts 35 hold the bottom flange 21 tightly flush against the top flange 18 to rigidly secure the perspective rails 19 and 20 in their operative positions coextensive with the respective sidewalls 15 and 16.

In a preferred form of the invention, the rail 19 is secured by its bolts 35 to the right top flange 18 of the right sidewall 15, and another identically constructed tie-down rail 20 of equal length, but reversed end-for-end to the flange 19, is secured by its corresponding bolts 35 to the top flange 18 of the sidewall 16, as illustrated in FIG. 1.

When a load is placed in the truck bed 12 of a nature which requires being secured in place, then the tie-down members such as the cables, lashings or ropes 33, are laid transversely over the load within the truck bed 12, and their opposite ends secured by their various connector members to the corresponding slots 27 within the respective tie-down rails 19 and 20. As previously mentioned, such connector members may be in the form of hooks 32 (FIG. 5) at each end of a flexible linear tie-down, such as a cable covered by a rubber sleeve. On the other hand, a simple rope may be used in which the ends of each rope is looped about or extends through the opposite slots 27, and the corresponding rod portions 25, and tied in a conventional knot. The tension exerted in the respective tie-down members 33 is upward and inboard to substantially correspond with the upward and inward attitude of the respective upright flanges 22 of the corresponding rails 19 and 20.

Tie-down rails 19 and 20 may be made in different lengths and sizes. The bottom flanges 21 may be wider, or narrower, or the overall height of the rails may be greater or less, depending upon the size of the truck bed and the type of pick-up truck or truck vehicle, upon which the rails are installed. Nevertheless, the overall construction of the rails 19 and 20 will be substantially the same, even for truck beds of different sizes, as previously described.

The front and rear ends 36 and 37 of the upright flanges 22, may be tapered, as disclosed in the drawings, for aesthetic reasons and also for safety, to eliminate sharp corners at the opposite ends of the rails 19 and 20.

The apertures or bolt holes 34 formed in the bottom flange 21 for receiving the bolts 35 may be spaced to correspond with existing stake holes in the top ledge 18 of the sidewalls 15 and 16, and a toggle bolt fastener member may be inserted through the respective holes to secure the bottom flange 21 to the top ledge 18

What is claimed is:

1. A tie-down rail for a truck bed, which truck bed has a pair of opposed sidewalls, each sidewall having an elongated top ledge, comprising:
   (a) an elongated unitary rail member having an angular cross-section and a length less than the length of the corresponding top ledge, and comprising a coextensive bottom flange and a coextensive singular substantially upright flange,
   (b) said bottom flange having a bottom surface adapted to fit substantially flush against and along the corresponding top ledge in an operative position, and having an inboard edge portion and an outboard edge portion,
   (c) said singular upright flange having a free upper edge portion and a bottom edge portion integrally merging with said outboard edge portion in an intersecting portion coextensive with both said flanges, the thickness of said intersecting portion being substantially greater than the thickness of said flanges,
   (d) said singular upright flange projecting upward and inboard over said bottom flange in said operative position, supported only by said intersecting portion, and forming an acute angle in the range of 45–80 deg. with said bottom flange,
   (e) said free upper edge portion terminating integrally in an upper elongated rod portion enlarged in cross-section,
   (f) a plurality of longitudinally spaced slots extending through said upright flange immediately below said rod portion, to receive a tie-down member through a slot and around said rod portion,
   (g) fastener means for securing said bottom flange in said operative position on a corresponding top ledge.

2. The invention according to claim 1 in which said rod portion has a rounded exterior surface in cross-section.

3. The invention according to claim 2 in which each of said slots has an upper edge portion which forms a continuation of the rounded surface of said rod portion.

4. The invention according to claim 1 in which each of said slots is elongated.

5. The invention according to claim 4 in which each of said elongated slots comprises rounded end portions.

6. The invention according to claim 1 in which said acute angle is approximately 79°.

7. The invention according to claim 1 in which the thickness of said rod portion is at least three times the thickness of said upright flange.

8. The invention according to claim 1 in which said bottom surface of said bottom flange is planar.

9. The invention according to claim 1 in which said fastener means comprises a plurality of longitudinally spaced fastener holes extending through said bottom flange.

* * * * *